United States Patent
McKee et al.

[11] Patent Number: 5,910,553
[45] Date of Patent: Jun. 8, 1999

[54] PREPARATION OF RUBBER-MODIFIED MOLDING MATERIALS BY MEANS OF GROUPS WHICH ARE INCORPORATED IN THE RUBBER AND FORM FREE RADICALS ON THERMAL DECOMPOSITION

[75] Inventors: Graham Edmund McKee, Neustadt; Rainer Moors, Germersheim; Hermann Gausepohl, Mutterstadt; Joachim Seibring, Freinsheim, all of Germany

[73] Assignee: BASF Aktiengesellschaft, Ludwigshafen, Germany

[21] Appl. No.: 08/836,309

[22] PCT Filed: Nov. 14, 1995

[86] PCT No.: PCT/EP95/04474

§ 371 Date: May 12, 1997

§ 102(e) Date: May 12, 1997

[87] PCT Pub. No.: WO96/15166

PCT Pub. Date: May 23, 1996

[30] Foreign Application Priority Data

Nov. 14, 1994 [DE] Germany .............................. 44 40 675

[51] Int. Cl.⁶ .................................................. C08F 118/02
[52] U.S. Cl. .............................. 526/319; 522/32; 522/60; 522/65; 522/113; 522/150; 526/328; 526/232.5; 526/345; 525/309
[58] Field of Search ................................ 522/32, 60, 65, 522/113, 150; 526/319, 328, 232.5, 345; 525/309

[56] References Cited

FOREIGN PATENT DOCUMENTS

| | | |
|---|---|---|
| 001 782 | 5/1979 | European Pat. Off. . |
| 095919 | 12/1983 | European Pat. Off. . |
| 143 991 | 6/1985 | European Pat. Off. . |
| 206 644 | 12/1986 | European Pat. Off. . |
| 539 988 | 5/1993 | European Pat. Off. . |
| 1414172 | 10/1964 | France . |
| 2328004 | 5/1977 | France . |
| 1182811 | 2/1962 | Germany . |
| 60210666 | 4/1984 | Germany . |
| 71003182 | 8/1993 | Japan . |
| 1041088 | 9/1966 | United Kingdom . |
| 90/03998 | 4/1990 | WIPO . |

OTHER PUBLICATIONS

Von Bruno Vollmert, *Die Ang. Makromol. Chem.,* vol. 3, 1968, No. 18, pp. 1–27.

*Primary Examiner*—Samuel A. Acquah
*Attorney, Agent, or Firm*—Keil & Weinkauf

[57] ABSTRACT

In the preparation of a rubber-modified molding material, in a first stage, a first mixture (A) contains at least one alkyl acrylate or methacrylate (a) of the formula (I)

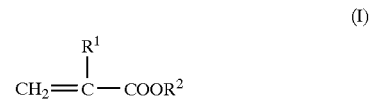

where

R¹ is hydrogen or methyl and R² is alkyl of 1 to 32 carbon atoms, at least one first monomer (b) which forms free radicals on thermal decomposition and, if required, a second monomer (c) or a plurality thereof is polymerized, preferably with free radicals, to give a rubber (B), in a second stage, the resulting rubber (B) is mixed with a third monomer (d) or a plurality thereof, preferably dissolved or swollen therein, to form a second mixture (C), and in a third stage, the second mixture (C) is polymerized with free radicals to give the rubber-modified molding material (D).

14 Claims, No Drawings

PREPARATION OF RUBBER-MODIFIED MOLDING MATERIALS BY MEANS OF GROUPS WHICH ARE INCORPORATED IN THE RUBBER AND FORM FREE RADICALS ON THERMAL DECOMPOSITION

The present invention relates to a process for the preparation of rubber-modified molding materials, groups which form free radicals on thermal decomposition being incorporated in the rubber, and to rubber-modified molding materials prepared by the process.

Rubber-modified molding materials are materials in which domains of elastomers, for example rubbers, are embedded in a matrix comprising a thermoplastic. There is considerable demand for rubber-modified molding materials which have surface gloss, impact strength and tensile strength. The characteristic domain structure is responsible for the desired mechanical properties.

The multiphase character and hence also the domain structure of rubber-modified molding materials is based on the fact that they are composed of different polymer components which are immiscible or only partly miscible with one another. The impact strength thereof results from increased energy absorption during deformation up to fracture. The energy is consumed for the formation of microcavities or for initiating sliding processes of the matrix polymer chains. The multiphase character is therefore essential for achieving high impact strengths.

The following are also applicable:

1. The two chemically different polymer components form a stable dispersion of defined particle size, which neither exhibits phase separation in the thermoplastic melt (processing) nor tends to homogenization with formation of a macromolecular solution at high temperatures.

2. Coupling must occur between the elastomer particles and the matrix, i.e. it must be possible to transmit forces at the phase boundaries.

The most effective phase coupling at the boundaries of the elastomer particles is achieved by graft copolymerization. For example, in the preparation of acrylonitrile/styrene/acrylate (ASA) molding materials, the procedure generally adopted is one in which an acrylate rubber is initially taken and, by polymerization with a monomer mixture comprising styrol and acrylonitrile, copolymers based on the latter two monomers are then grafted on.

EP 0 095 919, EP 0 143 991, EP 0 438 418, EP 0 001 782, DE 11 828 11, JP-A 71003-182, JA 60 21 0666 and B. Vollmert, Angewandte Makromolekulare Chemie, 3, 18 (1968), 1–27, describe the preparation of thermoplastics modified with acrylate rubbers.

It is an object of the present invention to provide a process for the preparation of rubber-modified molding materials having improved mechanical properties, in particular higher impact strengths, notched impact strengths and hole impact strengths.

We have found that this object is achieved by the novel process in which, in a first stage, a first mixture (A) which contains at least one alkyl acrylate or methacrylate (a) of the general formula (1)

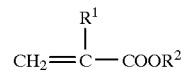

where
$R^1$ is hydrogen or methyl and $R^2$ is alkyl of 1 to 32 carbon atoms, at least one first monomer (b) which forms free radicals on thermal decomposition and, if required, a second monomer (c) or a plurality thereof is polymerized, preferably in solution, with free radicals to give a rubber (B), in a second stage, the resulting rubber (B) is mixed with a third monomer (d) or a plurality thereof, preferably dissolved or swollen therein, to form a second mixture (C), and in a third stage, the second mixture (C) is polymerized with free radicals to give the rubber-modified molding material (D). The polymerization being carried out either continuously as a solution or mass polymerization or being continued as a suspension polymerization after a conversion of at least 15%, the rubber-modified molding material (D), containing from 1 to 60% by weight of the rubber (B) and the rubbers (B) in grafted form being present in said molding material (D) as particles having a diameter of from 0.1 to 20 μm.

The first monomer (b) which forms free radicals on thermal decomposition should form only a few free radicals, if any at all, during its own polymerization.

The novel process has the advantage that, apart from the abovementioned properties, the weather resistance and the rigidity of the molding materials is also improved. By varying the preparation parameters, the gloss of the molding materials prepared can be varied over a wide range.

A graft copolymerization takes place in the third stage, the backbone of the resulting graft copolymer being formed by the rubber (B), and the grafts being composed of the third monomer (d). Because 100% grafting does not occur, some of the rubber remains ungrafted and at the same time an ungrafted chain polymer is formed from the third monomer or monomers (d) and constitutes the hard matrix. There are therefore at least three types of molecules in the molding material.

The groups incorporated in the rubber via the first monomer (b) form free radicals on thermal decomposition and therefore act as free radical initiator in the third stage, so that it is now assumed that a larger number of grafts is formed compared with rubbers without these groups. In the case of the groups which are incorporated according to the invention and form free radicals, the temperature at which they have a half-life of one hour is so high that they are stable in the process before the third stage, in particular at from 80 to 200° C., preferably from 80 to 150° C. Examples of such groups are peroxy groups, diazo groups and labile C—C bonds. Examples of suitable monomers (c) which contain these groups are tert-butyl 3-isopropenylcumyl peroxide, tert-butyl peroxycrotonate and tert-butyl monoperoxymaleate, the first two being preferred.

The determination of the temperature at which the monomers (b) have a half-life of one hour is described in the brochure entitled Initiators for Polymer Production from AKZO (Code: 92.10.10891).

Examples of alkyl groups $R^2$ of 1 to 32 carbon atoms are methyl, ethyl, n-propyl, isopropyl, n-butyl, isobutyl, tert-butyl, n-pentyl, isopentyl, n-hexyl, n-heptyl, n-octyl, ethylhexyl, n-nonyl, n-decyl, n-dodecyl, n-tetradecyl, n-hexadecyl, n-octadecyl, n-eicosyl, n-docosyl, n-tetracosyl, n-hexacosyl, n-octacosyl, n-triacontyl, n-hentriacontyl and dotriacontyl.

In a preferred embodiment of the invention, $R^2$ is alkyl of 1 to 18 carbon atoms.

In a further preferred embodiment of the invention, the mixture (A) has the following composition:
 from 30 to 99.95% by weight of the acrylate or methacrylate (a),
 from 0.05 to 10% by weight of the first monomer (b) and
 from 0 to 60% by weight of the second monomer (c);
the preferred ranges are:
 from 36 to 99.5% by weight of (a),
 from 0.1 to 4% by weight of (b) and
 from 0 to 60% by weight of (c).

The rubber (B) preferably has a glass transition temperature of less than 0° C., preferably less than −10° C., the glass transition temperature being determined by means of DSC according to ASTM 3418. The rubber thus has the required softness. The glass transition temperature can be established either by using an acrylate or methacrylate whose polymer has the desired glass transition temperature or by using a mixture of acrylates or methacrylates which have different lengths of the side chains ($R^2$ in the formula I). This adjustment of the glass transition temperature is based on the fact that the glass transition temperature of acrylate and methacrylate polymers initially decreases with increasing length of the side chain, then passes through a minimum and finally increases again. The minimum occurs at a side chain of about 7 carbon atoms for polyacrylates and at a side chain of 10 carbon atoms for polymethacrylates. This general range for the length of the side chain $R^2$ is therefore preferred. The rubber-modified molding material (D) prepared contains from 1 to 60, preferably from 5 to 40, % by weight of the rubber (B). The upper limit is determined by the fact that the molding material must have sufficient strength in spite of the embedded domains of the rubber. The lower limit is determined essentially by the fact that sufficient energy must be absorbed during deformation.

In a further preferred embodiment of the invention, the alkyl acrylate or methacrylate (a) used is n-butyl acrylate or ethylhexyl acrylate.

Monomers (c) which may be used are those which have two or more polymerizable double bonds, eg. allyl methacrylate, butanediol diacrylate, divinylbenzene, triallyl cyanurate and dihydrodicyclopentadienyl acrylate, allyl methacrylate being preferred.

Further examples of monomers (c) are styrene, acrylonitrile, acrylic acid, methacrylic acid, derivatives of the last two, such as methyl methacrylate, acrylamide, methacrylamide, glycidyl acrylate and glycidyl methacrylate, maleic anhydride, maleimide and ethylene. Styrene of the formula

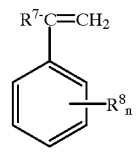

where
 $R^7$ and $R^8$, which may be identical or different, are each hydrogen or alkyl of 1 to 8 carbon atoms and
 n is from 0 to 4, acrylonitrile and/or methyl methacrylate are preferred.

Further examples of monomers (c) are derivatives of acrylamide and of methacrylamide, such as methylolacrylamide methyl ether, N-methylolacrylamide, methylolmethacrylamide methyl ether, N-methylolmethacrylamide, N-methylolmethacrylamide butyl ether and N-methylolmethacrylamide acetate. The mixture (A) contains up to 60, preferably up to 40, % by weight of these monomers.

Examples of the monomers (d) are those already stated for (c), preferably styrene and acrylonitrile. Accordingly, in particular ASA molding materials are prepared by the novel process.

In the third stage of the novel process, the polymerization can either be carried out continuously as a solution or mass polymerization or can be continued as a suspension polymerization after a conversion of at least 15%.

The content of acrylate monomer units in the rubber is at least 30, preferably at least 60, particularly preferably at least 90, % by weight.

In the molding material, the rubbers in grafted form occur as particles having a diameter of from 0.1 to 20 μm, preferably from 0.1 to 10 μm, in the polymer matrix. Bimodal or trimodal distributions are preferred. The rubber particles are in the form of capsules, rods, drops, labyrinths, cells, coils, shells, rod clusters or drop clusters. However, particles which consist of a plurality of spherical particles are also observed. Cells and the last-mentioned type are preferred. The stated particle forms are described in A. Echte, Advances in Chemical Serials, 222 (1989), 29.

The invention is described in detail below with reference to particularly preferred embodiments.

EXAMPLES

The following compounds are used in the Examples: cyclohexane, n-butyl acrylate, allyl acrylate, acrylonitrile and styrene are products from BASF and are used without further purification.

Luviskol® K 90 is also a product from BASF and is a polyvinylpyrrolidone having a K value of 90, measured in 1% strength solution in water at 25° C. The measurement of the K value is described in Cellulose Chemie, 13 (1932), 358–364.

Tetrasodium diphosphate was obtained from Merck, azobisisobutyronitrile from Akzo Chemicals and allyl methacrylate from Fluka.

The stabilizer used was octadecyl 3-(3,5-di-tert-butyl-4-hydroxyphenyl)-propionate, a phenolic antioxidant which is sold under the name Irganox 1076 by Ciba Geigy.

Ertivinol® is a polyvinyl alcohol from Ercros.

Peroxides

Peroxide 1: tert-Butyl peroxycrotonate
The temperature for a half-life of one hour is 110° C.
Peroxide 2: tert-Butyl 3-isopropenylcumyl peroxide
The temperature for a half-life of one hour is 139° C.

Experiment 1 (according to the invention)

a) Rubber preparation 1100 g of cyclohexane were introduced into a flask and heated to 75° C. under nitrogen and with stirring, and 30 ml of feed 1 and 4 ml of feed 2 were then introduced. After 15 minutes, the remainder of the two feeds was added in the course of about 4 hours.

Feed 1

500 g of n-butyl acrylate 4.75 g of allyl methacrylate 8.75 g of peroxide 2 (1.75% by weight, based on rubber)

Feed 2

42 ml of acetone 42 ml of toluene 550 mg of 2,2'-azobisisobutyronitrile b) Preparation of the end product The cyclohexane was removed in a rotary evaporator under reduced pressure and replaced with styrene, and acrylonitrile was then added to give a mixture of 69.2% by weight of styrene, 23% by weight of acrylonitrile and 7.8% by weight of rubber. 1923 g of this solution, together with 2.31 g of Irganox 1076 and 1.35 g of tert-dodecyl mercaptan, were introduced into a 5 l steel kettle and heated to 110° C. under nitrogen and with stirring. After a polymerization time of 105 minutes (35–40% conversion), 1.7 g of dicumyl peroxide, 1900 g of water, 20 g of Luviskol K 90, 2.0 g of tetrasodium diphosphate and 59.8 g of a 10% strength solution of Ertivinol in water were added. Polymerization of the batch was completed as follows:

at 110° C. for 3 h at 130° C. for 3 h at 140° C. for 6 h.

The mixture was then cooled and the polymer was filtered off and dried.

Experiment 2

Experiment 1 was repeated, but with 20 g of peroxide 1 (4% by weight, based on the rubber) instead of 8.75 g of peroxide 2. The styrene/acrylonitrile polymerization was carried out at 86° C.

Experiment 3

Experiment 1 was repeated, but 10 g (instead of 8.75 g) of peroxide 2 (2% by weight, based on the polymer) were used.

Experiment 4

Comparative Experiment (without peroxides incorporated in the rubber)

The rubber was prepared without peroxides 1 and 2. Dibenzoyl peroxide was used as a free radical initiator for the polymerization.

The polymerization temperature before the addition of water was 86° C. Otherwise, the procedure was as in Experiment 1.

Testing of the Products

The products were injection molded at a melt temperature of 240° C. and a mold temperature of 60° C. to give standard small bars.

The hole impact strength according to DIN 53753-L-3,0, 4/81 edition, the impact strength according to DIN 53453-n, 5/75 edition, and the notched impact strength according to DIN 53453-k, 5/75 edition, were determined for these moldings.

Results

| Experi-ment | % by weight of peroxides 1 and 2 in the rubber | Impact strength at 230° C. kJ/m$^2$ | Hole im-pact strength at 230° C. kJ/m$^2$ | Notched im-pact strength at 230° C. kJ/m$^2$ | Particle size distribution |
|---|---|---|---|---|---|
| 1. | 1.75 peroxide 2 | 32 | 9.8 | 2.4 | Trimodal: 2 μm; 1 μm; 1 μm |
| 2. | 4.00 peroxide 1 | 32 | 10.6 | 2.6 | Trimodal: 5 μm; 1 μm; 0.1 μm |
| 3. | 2.00 peroxide 2 | 28 | 9.1 | 2.4 | Bimodal: 1 μm; 0.2 μm |
| 4. | none | 16 | 6.1 | 1.7 | |

As can be seen, the peroxides incorporated as polymerized units lead to better mechanical properties of the molding materials prepared.

We claim:

1. A process for the preparation of a rubber-modified molding material, which comprises i) in a first stage, polymerizing a first mixture (A) comprising at least one alkyl acrylate or methacrylate (a) of the formula (I)

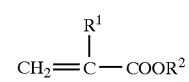

(I)

wherein $R^1$ is hydrogen or methyl and $R^2$ is alkyl of 1 to 32 carbon atoms, at least one first monomer (b) which contains a diazo group or a C—C double bond which is sensitive to thermal decomposition, or which monomer (b) is tert.-butyl 3-isopropenylcumyl peroxide or tert.-butyl peroxycrotonate, and optionally a second monomer (c) or a plurality thereof to give a rubber (B), ii) in a second stage, mixing the rubber (B) with a third monomer (d) or a plurality thereof, to form a second mixture (C), and iii) in a third stage, polymerizing the second mixture (C) with free radicals to give the rubber-modified molding material (D), the polymerization being carried out either continuously as a solution or mass polymerization or being continued as a suspension polymerization after conversion of at least 15%, the rubber-modified molding material (D) containing from 1 to 60% by weight of the rubber (B), and the rubber (B) in grafted form being present in the rubber-modified molding material (D) as particles having a diameter of from 0.1 to 20 μm.

2. The process defined in claim 1, wherein the mixture (A) is polymerized with free radicals.

3. The process defined in claim 1, wherein the rubber (B) is dissolved or swollen in the third monomer (d) or a plurality thereof.

4. The process defined in claim 1, wherein $R^2$ is alkyl of 1 to 18 carbon atoms.

5. The process defined in claim 1, wherein the mixture (A) is composed of from 30 to 99.95% by weight of the acrylate or methacrylate (a), from 0.05 to 10% by weight of the first monomer (b), and from 0 to 60% by weight of the second monomer (c).

6. The process defined in claim 1, for the preparation of rubber-modified molding material (D) containing from 5 to 40% by weight, based on the total amount of (D), of the rubber (B).

7. The process defined in claim 1, wherein the alkyl acrylate or methacrylate (a) is n-butyl acrylate or ethylhexyl acrylate.

8. The process defined in claim 1, wherein the second monomer (c) contains two or more polymerizable double bonds.

9. The process defined in claim 1, wherein the third monomer (d) is styrene, methyl methacrylate or acrylonitrile or a mixture thereof.

10. The process defined in claim 1, wherein the second monomer (c) is allyl methacrylate.

11. The process defined in claim 10, wherein the second monomer (c) further comprises styrene, acrylonitrile or methyl methacrylate.

12. A rubber-modified molding material (D) which is prepared according to the process defined in claim 1, and wherein the rubber (B) particles form domains.

13. The rubber-modified material (D) defined in claim 12, wherein the rubber (B) particles form capsules, rods, drops, labyrinths, cells, coils, shells, rod clusters or drop clusters.

14. A rubber-modified molding material (D) which is prepared according to the process defined in claim 5.

* * * * *